(12) United States Patent
Liu et al.

(10) Patent No.: US 12,522,059 B2
(45) Date of Patent: Jan. 13, 2026

(54) EMBEDDED CAR COVER

(71) Applicant: ZHEJIANG SURPASS AUTO PARTS CO., LTD., Wenzhou (CN)

(72) Inventors: Chengqiang Liu, Wenzhou (CN); Yi Lin, Wenzhou (CN); Lei Lin, Wenzhou (CN)

( * ) Notice: Subject to any disclaimer, the term of this patent is extended or adjusted under 35 U.S.C. 154(b) by 393 days.

(21) Appl. No.: 18/184,832

(22) Filed: Mar. 16, 2023

(65) Prior Publication Data
US 2024/0286473 A1  Aug. 29, 2024

(30) Foreign Application Priority Data

Feb. 27, 2023  (CN) .......................... 202310200570.4

(51) Int. Cl.
| | | |
|---|---|---|
| B60J 7/14 | (2006.01) | |
| B60J 7/00 | (2006.01) | |
| B60J 7/19 | (2006.01) | |

(52) U.S. Cl.
CPC ............. B60J 7/141 (2013.01); B60J 7/0084 (2013.01); B60J 7/198 (2013.01)

(58) Field of Classification Search
CPC ........... B60J 7/141; B60J 7/198; B60J 7/0084
See application file for complete search history.

(56) References Cited

U.S. PATENT DOCUMENTS

| | | | |
|---|---|---|---|
| 8,690,224 B2 | 4/2014 | Maimin | |
| 9,815,358 B1 | 11/2017 | Quintus | |
| 10,471,814 B1 * | 11/2019 | Weng | B60P 7/02 |
| 10,730,375 B2 * | 8/2020 | Ma | B60P 7/02 |
| 11,180,010 B1 * | 11/2021 | Xu | B60J 7/0084 |
| 11,186,151 B1 * | 11/2021 | Xu | B60P 7/04 |
| 11,235,650 B2 * | 2/2022 | Gu | B60P 7/02 |
| 11,299,021 B2 * | 4/2022 | Dylewski, II | B60J 7/198 |
| 11,331,990 B2 * | 5/2022 | Carter | B60J 7/1607 |
| 11,345,223 B2 * | 5/2022 | Zheng | B60J 7/1607 |

(Continued)

FOREIGN PATENT DOCUMENTS

| | | |
|---|---|---|
| CN | 111645501 A | 9/2020 |
| CN | 112046384 A | 12/2020 |

*Primary Examiner* — Jason S Morrow

(57) ABSTRACT

The present invention discloses an embedded car cover including a front bar assembly, a cover plate, a rotating shaft system, a rear bar assembly, a lock system and a guide rail, the front bar assembly, guide rail and rear bar assembly forming a rectangular car cover frame, the guide rail is provided with two, both guide rails are connected to the cargo hopper on each side, the guide rails plane is connected with a first waterproof rubber strip, the rotating shaft system is locked to the guide rail by means of a lock system, the rotating shaft system includes a left intermediate bar, a right intermediate bar and intermediate rotating bar, the left intermediate bar and the right intermediate bar are respectively connected to the intermediate rotating bar by rotation, a second waterproof rubber strip is connected at the rotation of the left intermediate bar and the intermediate rotating bar, and at the rotation of the right intermediate bar and the intermediate rotating bar. By providing the first waterproof rubber strip on the guide rail plane, it forms a first drainage tank between the first waterproof rubber strip and the guide rail, which can greatly improve the drainage efficiency and prevent rainwater leakage.

9 Claims, 13 Drawing Sheets

(56) References Cited

U.S. PATENT DOCUMENTS

| | | | | |
|---|---|---|---|---|
| 11,376,935 | B2* | 7/2022 | Fu | B60J 7/141 |
| 11,407,294 | B2* | 8/2022 | Shen | B60J 7/141 |
| 12,269,328 | B2* | 4/2025 | Xu | B60J 7/104 |
| 2019/0291550 | A1* | 9/2019 | Ma | B60J 7/141 |
| 2021/0016646 | A1* | 1/2021 | Dylewski, II | B60J 7/141 |
| 2021/0061079 | A1* | 3/2021 | Sun | B60J 7/141 |
| 2021/0379970 | A1* | 12/2021 | He | B60J 10/27 |
| 2023/0079111 | A1* | 3/2023 | Bao | B60J 5/14 160/133 |
| 2024/0174064 | A1* | 5/2024 | Dylewski, II | B60J 7/141 |
| 2024/0286470 | A1* | 8/2024 | Wang | B60J 7/141 |
| 2025/0050717 | A1* | 2/2025 | Zheng | B60J 7/141 |
| 2025/0128582 | A1* | 4/2025 | Xu | B60J 7/141 |

* cited by examiner

EMBEDDED CAR COVER

TECHNICAL FIELD

This invention is relevant to automobile accessories, especially an embedded car cover.

BACKGROUND TECHNOLOGY

The cargo hopper of a pick-up truck (also known as a sedan truck) is used to carry goods, as long as it is open, in order to avoid the rain from wetting the goods inside the cargo hopper in rainy and snowy weather, a car cover is invented and installed on the cargo hopper of the pick-up truck, using the car cover to shelter the goods in the cargo hopper to avoid the goods inside from being wet by rain.

Most of the existing car cover front rails are formed in an integrated structure, making the processing difficult and the yield low, followed by the overall waterproof and drainage effect of the car cover is poor, prone to water leakage problems.

ABOUT THE INVENTION

The purpose of the invention is to improve the yield of the front bar by changing the structure of the front bar as well as the processing method, and secondly to change the drainage structure of the cover so that the cover is better waterproof.

In order to solve the above problems of the existing technology, the technical solution adopted in the invention is as follows.

An embedded car cover includes a front bar assembly, a cover plate, a rotating shaft system, a rear bar assembly, a lock system and a guide rail.

The front bar assembly, guide rails and rear bar assembly forming a rectangular car cover frame, the guide rails are provided with two, both guide rails are connected to the cargo hopper on each side, the guide rails plane is connected with a first waterproof rubber strip.

The front bar assembly includes a front bar intermediate bar, a first front bar unit and a second front bar unit, the front bar intermediate bar is connected to a cover plate, the front bar intermediate bar is connected to the first front bar unit in rotation, the second front bar unit is in detachable connection with the first front bar unit. The plate bodies are connected to each other by a rotating shaft system.

The rotating shaft system is locked to the guide rail by means of a locking system, the rotating shaft system includes a left intermediate bar, an intermediate rotating bar and a right intermediate bar, the left intermediate bar and right intermediate bar are respectively connected to the intermediate rotating bar by rotation, a second waterproof rubber strip is connected at the rotation of the left intermediate bar to the intermediate rotating bar and at the rotation of the right intermediate bar to the intermediate rotating bar.

The traditional front bar assembly is processed in a one-piece forming method, which makes the profile easily deformed during the extrusion process due to the wide front bar, resulting in a low yield. The present invention changes the front bar assembly into a split structure, respectively the first front bar unit and the second front bar unit, and then connects the two parts to form a finished front bar during installation, which greatly improves the yield of the front bar. Therefore, during the connection, glue is applied to the joint between the first front bar unit and the second front bar unit to ensure the stability of the connection.

By providing a first waterproof rubber strip on the guide rail plane, a first drainage tank is formed between the first waterproof rubber strip and the guide rail, enabling effective drainage and preventing rainwater leakage. . . .

Further, the left intermediate bar and right intermediate bar are used to connect the cover plate, a mounting groove is provided on the left intermediate bar and right intermediate bar, and then the second waterproof rubber strip is located in the mounting grooves, by providing the second waterproof rubber strip, which is in contact with the rotation groove, both the relative rotation of the rotating shaft assembly and its waterproofing effect are ensured, the second front bar unit is provided with a front bar mounting port, the front bar mounting port is connected with a fixing member, the second front bar unit is connected to the cargo hopper or guide rail by means of the fixing member, the front bar is connected to the cargo hopper or guide rail by the fixing member, which is frequently used connection method for existing front rails and can be directly transposed here, a drainage tank is formed between the first waterproof rubber strip and the guide rail, both ends of the rotating shaft system extend beyond the first waterproofing strip, any water that accumulates in the rotating shaft system, the front bar assembly or the rear bar assembly as it flows to both sides enters the first drainage tank and is discharged directly from the first drainage tank.

Further, the rotating shaft system includes a first rotating shaft system and a second rotating shaft system, the intermediate rotating bar of the first rotating shaft system is of the same or different dimensions to the intermediate rotating bar of the second rotating shaft system, both the first rotating shaft system and the second rotating shaft system are used for flipping the cover plate, therefore the first rotating shaft system and the second rotating shaft system can be of the same or different rotating structure and can also be the same or different dimensions, the first rotating shaft system includes a left intermediate bar, an intermediate rotating bar and a right intermediate bar, the intermediate bar is provided with two rotating grooves at both ends, the left intermediate bar and the right intermediate bar are each provided with a rotating section, the rotating portion is connected to the rotating groove by rotation, the rotating portion and the rotating groove forming a second drainage tank, the mounting groove is provided in the rotating portion, the mounting groove is connected with a second waterproof rubber strip, since both ends of the rotating shaft system extend beyond the first waterproof rubber strip, all water in the second drainage tank flows into the first drainage tank and is then discharged from the first drainage tank, the left intermediate bar is able to rotate about 90° relative to the intermediate rotating bar, the right intermediate bar is able to rotate about 90° relative to the intermediate bar, by the rotation of the left intermediate bar and the right intermediate bar with respect to the intermediate rotating bar, the cover plate is driven to turn over.

Further, the rotating shaft system further includes a left joint, a right joint and an intermediate joint, the left intermediate bar is connected with a left joint, the right intermediate bar is connected with a right joint, the intermediate rotating bar is connected with an intermediate joint, the intermediate joint is provided with an intermediate joint mounting hole and an intermediate joint drainage section, the intermediate joint mounting hole is provided in correspondence with the intermediate rotating bar screw fixing groove, the intermediate joint drainage section is provided in correspondence with the rotating groove, the right joint is provided with a right joint sealing section, the right joint sealing section is connected to the right intermediate bar by a same second waterproof rubber strip, the right joint sealing section is located on the upper side of the intermediate joint drainage section, the right joint sealing section and intermediate joint drainage part forming a drainage outlet, which is corresponding to the drainage tank, the joint is used to connect with the rotating bar, while the joint is provided with a drainage outlet, the joint will be pressed against the first waterproof rubber strip during installation and the water in the second drainage tank will be discharged into the first drainage tank through the drainage port, the right intermediate bar is provided with a right intermediate bar locking system groove, the right intermediate bar locking system groove is used to connect the locking system, which can lock the rotating shaft system and prevent the vehicle cover from opening during driving.

Further, the lock system includes a first lock fixing structure and a second lock fixing structure, the first lock fixing structure includes a fixing section and a sliding section, the fixing section includes a clamp and a lock fixing block, the clamp is connected to the cargo hopper, the cylindrical lock fixing block is connected to the clamp, the sliding section is connected to the rotating shaft system, the sliding section includes a lock bolt, a wire rope and a handle, both ends of the wire rope are connected to a lock bolt, the wire rope is sleeved to the handle.

Further, the second lock bolt fixing structure includes a fixed section and a sliding section, the fixed section includes a lock bolt fixing block connected to the guide rail, the sliding section is connected to the rotating shaft system, the sliding portion includes a lock bolt, a wire rope and a handle, both ends of the wire rope are connected to a lock bolt, the wire rope is sleeved to the handle, the first lock bolt fixing structure is connected to the cargo hopper directly, so the guide rails need to be segmented during installation, the guide rails need to be disconnected at the first lock bolt fixing structure, the second lock bolt fixing structure is connected to the guide rail, which can be made integral, so that the lock bolt is directly connected to the guide rail, the first lock bolt fixing structure and the second lock bolt fixing structure can be the same or different structure, and the dimensions of both can also be the same or different, the left joint and right joint extend to the cover plate on both sides, extending the length of the left joint and right joint so that they are in contact with the plate, thus improving the waterproofing effect.

Further, it includes two long rubber strips, the two long rubber strips are connected to each side of the car cover (herein referred to as the car cover), the long rubber strips are connected to the front bar assembly, the rotating shaft system and the rear bar assembly, the left joint further includes a left joint baffle, the left joint baffle is placed on the upper side of the long rubber strip, the right joint further includes a right joint baffle, the right joint baffle is placed on the upper side of the long rubber strips, the intermediate joint further includes an intermediate joint water baffle, the intermediate joint water baffle is placed on the upper side of the long rubber strip, the guide rail further includes a guide rail mounting plane, the long rubber strip is pressed against the guide rail when the car cover is closed, the left joint water baffle, right joint water baffle and intermediate joint water baffle have flush edges, the left joint water baffle and right joint water baffle extend to the cover plate on both sides respectively, as the joint baffle is connected to the long rubber strip, setting a plurality of joint water baffles flush can not only improve the stability of the connection with the long rubber strip, but also play a good waterproof effect, the long rubber strip is better waterproof because it comes in one piece and covers both sides of the car cover completely, with no breaks in the middle of the long rubber strip. However, the existing rubber strips are often broken at the joint of the rotating shaft system in order to adapt to the rotation of the rotating shaft system, so that the waterproofing effect is greatly reduced by breaking the long rubber strip into multiple segments. Furthermore, although the joint baffle in this invention is located on the upper side of the long rubber strip, the centre of the rotating shaft is located on the lower side of the long rubber strip as it is an embedded car cover and the whole of the cover is located inside the cargo hopper, the long rubber strip is not stretched but compressed while the rotating shaft system is turned upwards, so that a whole long rubber strip does not affect the rotation of the rotating shaft system. The beneficial effects of the invention are as follows.

The traditional front bar assembly is processed in a one-piece forming method, which makes the profile easily deformed during the extrusion process due to the wide front bar, resulting in a low yield. The present invention changes the front bar assembly into a split structure, respectively the first front bar unit and the second front bar unit, and then connects the two parts to form a finished front bar during installation, which greatly improves the yield of the front bar. Since the first front bar unit and the second front bar units no longer need to be disassembled after they have been joined, glue is applied to the joint between the first front bar unit and the second front bar unit during the connection to ensure a stable connection.

In the present invention, the long rubber strip is better waterproof because it comes in one piece and covers both sides of the car cover completely, with no breaks in the middle of the long rubber strip. Furthermore, the rotating shaft system in the present invention is located on the lower side of the long rubber strip, so that the long rubber strip is not stretched but compressed while the rotating shaft system is turned upwards, so that a whole long rubber strip does not affect the rotation of the rotating shaft system.

Figure 1:
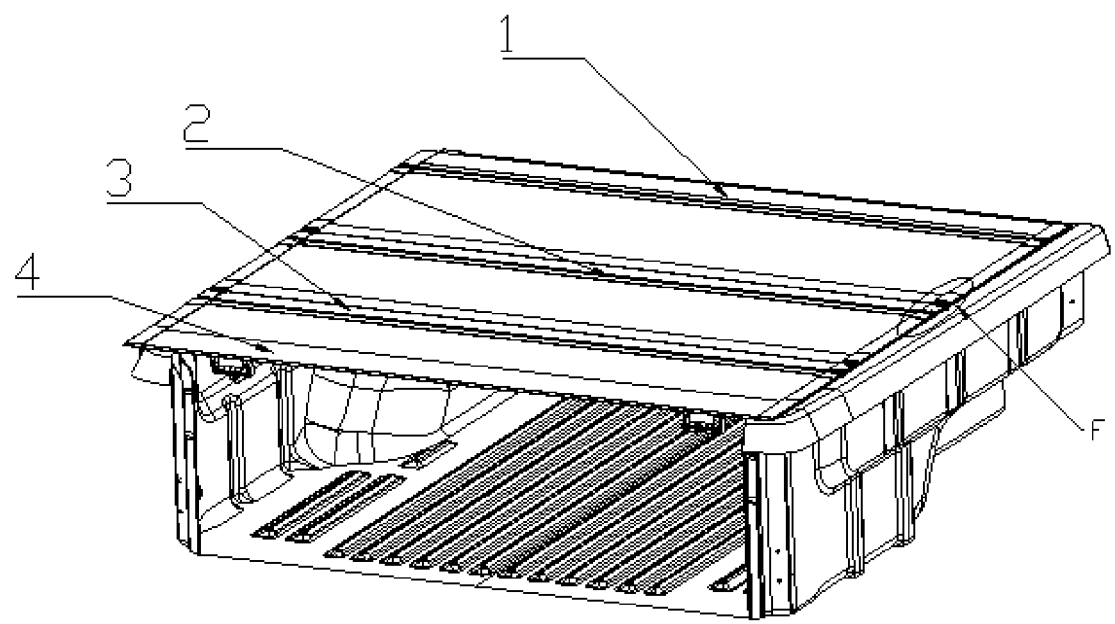
FIG. 1 is the connection schematic diagram of the car cover of the invention.

In the picture: Figure: 1—Front bar assembly, 11—Front bar intermediate bar, 12—First front bar unit, 1201—First front bar concave portion, 13—Second front bar unit, 1301—Second front bar projection, 1302—Front bar mounting port, 2—First rotating shaft system, 21—Left intermediate bar, 22—Intermediate rotating bar, 2201—Intermediate rotating bar screw fixing groove, 2202—Rotating groove, 23—Right intermediate bar, 2301—Right intermediate bar locking system channel, 2302—Rotating section, 24—Right joint, 2402—Right joint baffle, 25—Intermediate joint, 2501—Intermediate joint baffle, 2502—Intermediate joint drainage section, 2503—Intermediate joint mounting hole, 26—Left joint, 2601—Left joint baffle, 27—Second waterproof rubber strip, 3—Second rotating shaft system system, 4—Rear bar assembly, 5—First lock bolt fixing structure, 51—Lock bolt fixing block, 6—Second lock bolt fixing structure, 71—First waterproof rubber strip, 72—Guide rail plane, 73—Long rubber strip, 74—Guide mounting plane, 8—Cargo hopper.

The Concrete Method to Carry Out

The following instruction further explains the invention's concrete implementation method.

In order to enable a clearer understanding of the objects mentioned above, features and advantages of the present invention, the invention is described in detail below in connection with the accompanying drawings and specific embodiments. It should be noted that the embodiments of the present invention and the features in the embodiments can be combined without conflict.

The terms "first", "second", "third", etc. are only used to differentiate the description and should not be construed as indicating or implying relative importance.

In the description of the invention, it should also be noted that, unless otherwise expressly specified and limited, the terms "arranged," "installed," "connected," and "combined" should be understood in a broad sense. for example, it may be a fixing connection, it can also be a detachable connection or an integral connection. it can be a mechanical connection or an electrical connection. it can be a direct connection or an indirect connection through an intermediate media, and it can be internal connection within two assemblies. For those of ordinary skill in this field, specific meanings of the above terms in the present invention can be understood in specific situations.

The specific embodiments of the present invention will be described in detail below in connection with the accompanying drawings. It should be understood that the specific embodiments described herein are intended only to illustrate and explain the present invention and not to limit it.

Embodiment 1

As shown in FIGS. 1, 5-7 and 12, an embedded car cover includes a front bar assembly, a cover plate, a rotating shaft system, a rear bar assembly 4, a lock system and a guide rail.

The front bar assembly 1, guide rails and rear bar assembly 4 forming a rectangular car cover frame, the guide rails are provided with two, both guide rails are connected to the cargo hopper 8 on each side, the guide rails plane 72 is connected with a first waterproof rubber strip 71.

The front bar assembly 1 includes a front bar intermediate bar 11 and at least two front bar units, the front bar intermediate bar 11 is connected to one of the front bar units by rotation, a plurality of front bar units are connected to each other.

The plate bodies are connected to each other by a rotating shaft system.

The rotating shaft system is locked to the guide rails by means of a locking system, the rotating shaft system includes a left intermediate bar 21, an intermediate rotating bar 22 and a right intermediate bar 23, the left intermediate bar 21 and right intermediate bar 23 are respectively connected to the intermediate rotating bar 22 by rotation, a second waterproof rubber strip 27 is connected at the rotation of the left intermediate bar 21 to the intermediate rotating bar 22 and at the rotation of the right intermediate bar 23 to the intermediate rotating bar 22.

The front bar unit includes a first front bar unit 12 and a second front bar unit 13, the front bar intermediate bar 11 is connected with a cover plate, the front bar intermediate bar 11 is rotatably connected to the first front bar unit 12, the second front bar unit 13 is in detachable connection with the first front bar unit 12.

The traditional front bar assembly 1 is processed in a one-piece forming method, which makes the profile easily deformed during the extrusion process due to the wide front bar, resulting in a low yield, the present invention changes the front bar assembly 1 into a split structure, respectively the first front bar unit 12 and the second front bar unit 13, and then connects the two parts to form a finished front bar during installation, which greatly improve the yield of the front bar, the first front rail unit 12 and the second front rail unit 13 no longer need to be disassembled after connection, so glue is applied to the joint of the first front rail unit 12 and the second front rail unit 13 during the connection to ensure the stability of the connection.

By providing a first waterproof rubber strip 71 on the guide rail plane 72, a first drainage tank is formed between the first waterproof rubber strip 71 and the guide rail, enabling effective drainage and preventing rainwater leakage.

The first front bar unit 12 includes a first front bar concave portion 1201, the second front bar unit 13 includes a second front bar convex portion, the first front bar concave portion 1201 and the second front bar convex portion snap together. When connecting, glue is first applied to the contact surface of the first concave portion 1201 of the front bar and the second convex portion of the front bar, and then the first concave portion 1201 of the front bar is snap-fitted to the second convex portion of the front bar.

Embodiment 2

Figure 8:
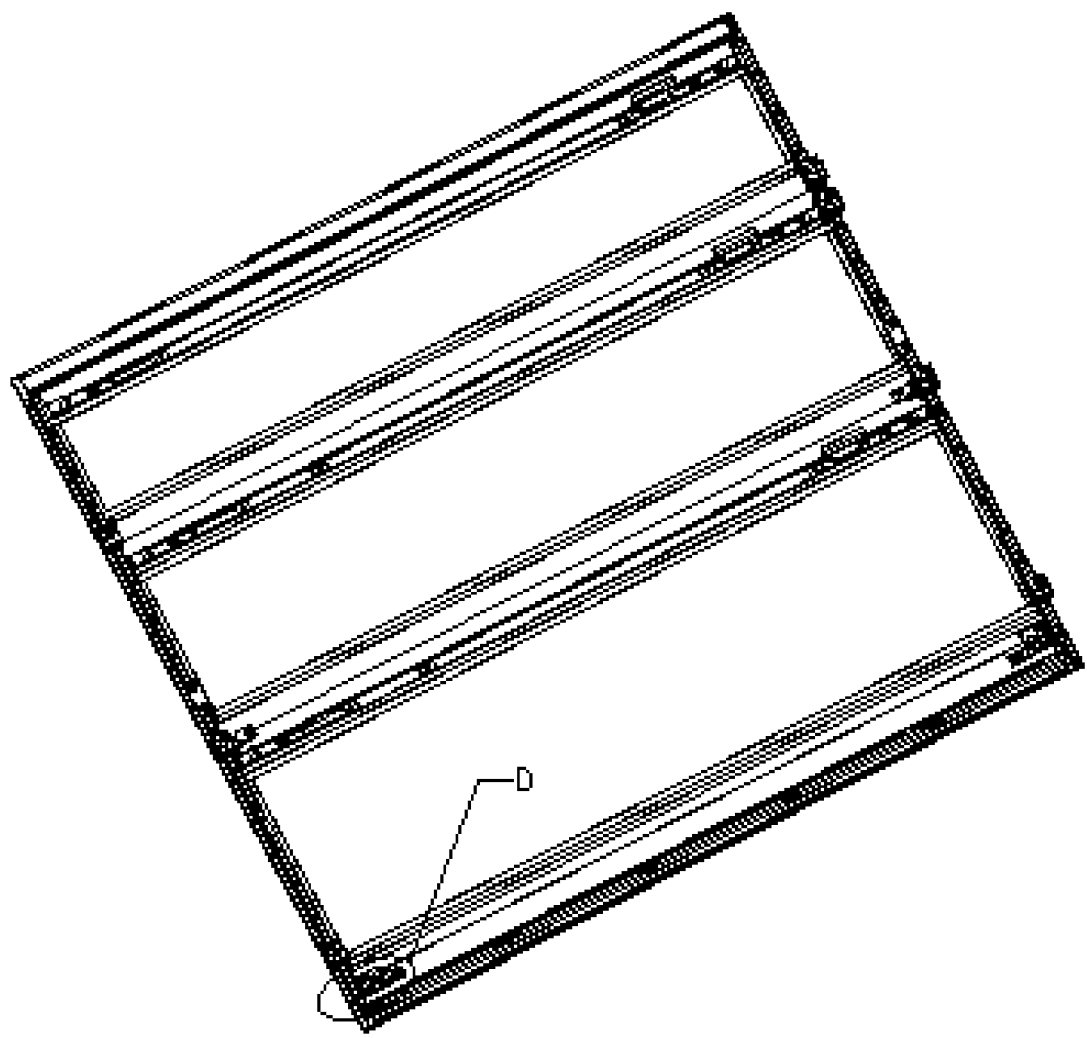
FIG. 8 is the structure schematic diagram of the car cover of the invention.
Figure 9:
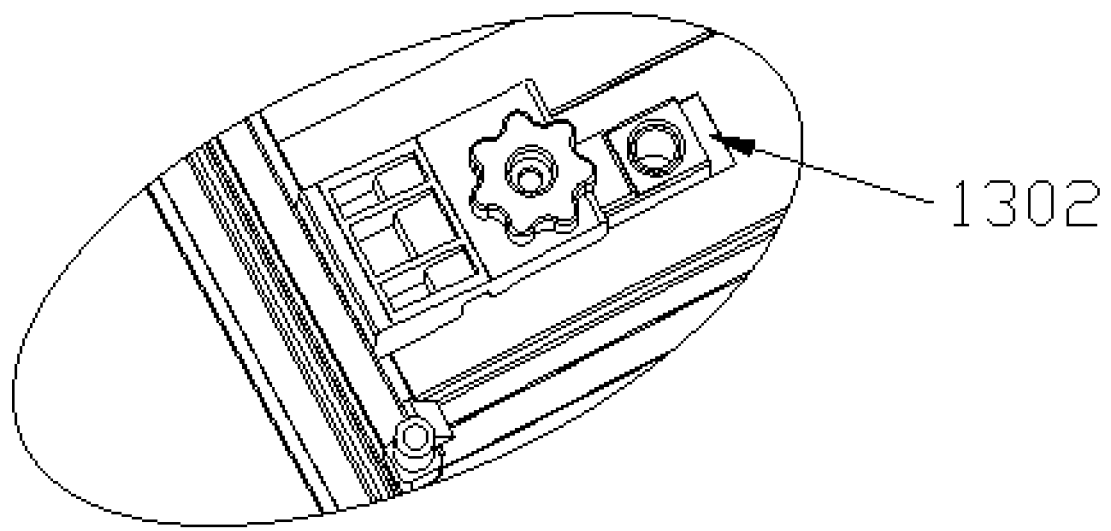
FIG. 9 is the partial enlarged view of part D in FIG. 8.

On the basis of embodiment 1, as shown in FIGS. 8-9, the left intermediate bar 21 and right intermediate bar 23 are used to connect the cover plate.

A mounting groove is provided on the left intermediate bar 21 and the right intermediate bar 23, and then the second waterproof rubber strip 27 is located in the mounting groove.

By providing the second waterproof rubber strip 27, which is in contact with the rotation groove 2202, both the relative rotation of the rotating shaft assembly and its waterproofing effect are ensured.

The second front bar unit 13 is provided with a front bar mounting port 1302, the front bar mounting port 1302 is connected with a fixing member, the second front bar unit 13 is connected to the cargo hopper 8 or the guide rail by means of the fixing member.

The front bar is connected to the cargo hopper 8 or guide rails by the fixing member, which is a frequently used connection method for existing front bars and can be directly transposed.

A drainage tank is formed between the first waterproof rubber strip 71 and the guide rail, both ends of the rotating shaft system extend beyond the first waterproof rubber strip 71.

Any water that accumulates in the rotating shaft system, the front bar assembly 1 or the rear bar assembly 4 as it flows to both sides enters the first drainage tank and is discharged directly from the first drainage tank.

Embodiment 3

Figure 10:
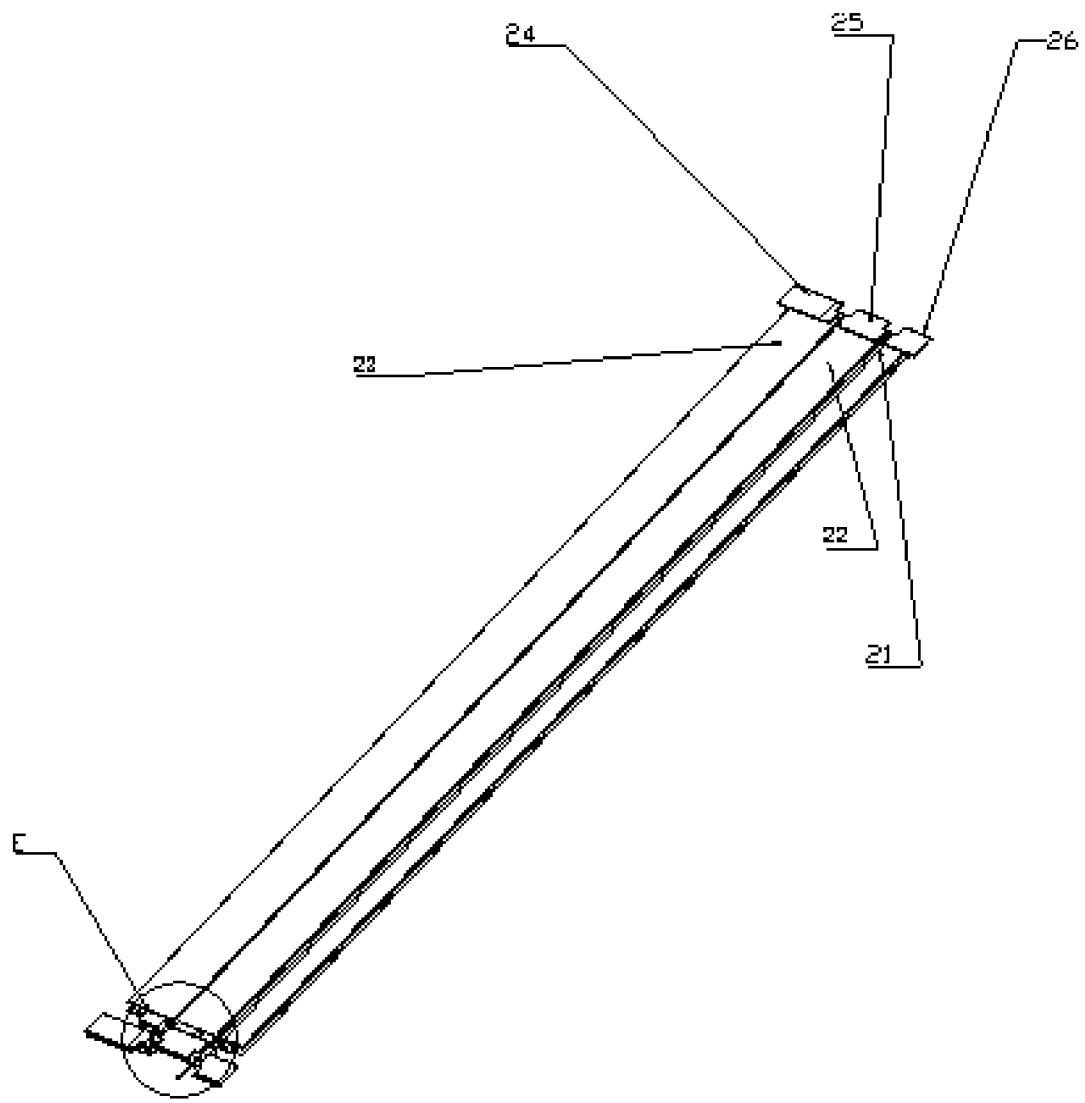
FIG. 10 is the structure schematic diagram of the rotating shaft system.
Figure 11:
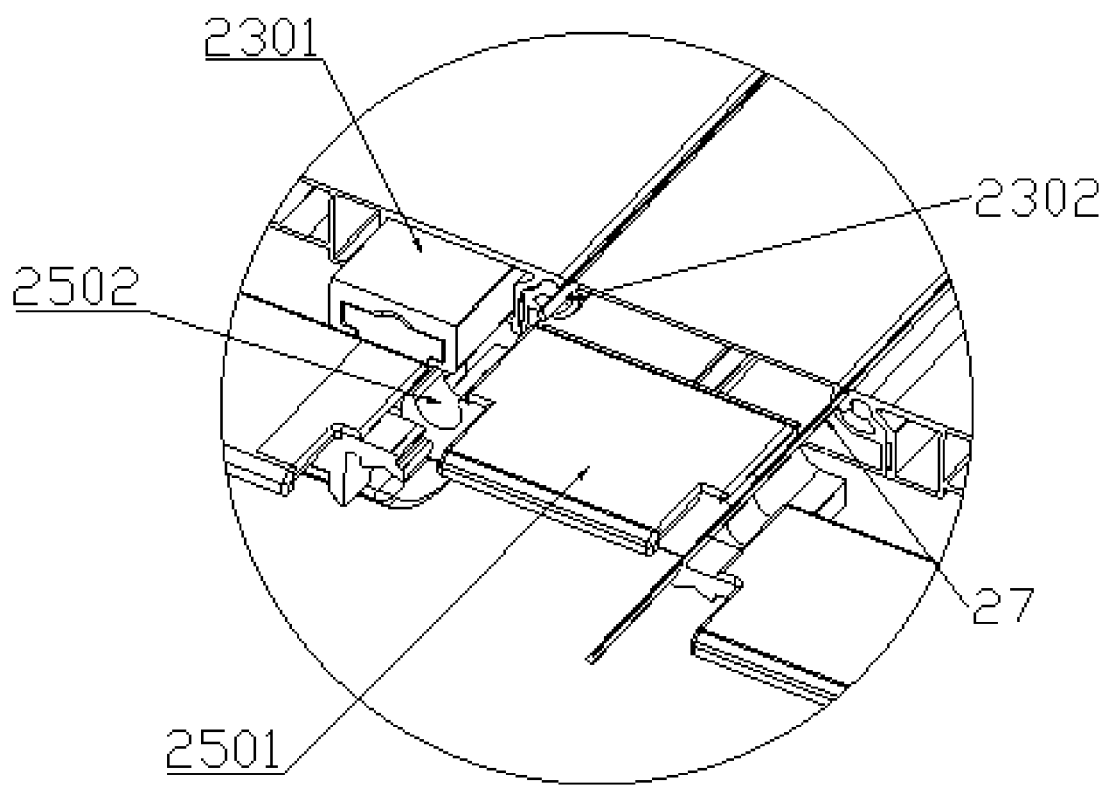
FIG. 11 is the partial enlarged view of part E in FIG. 10.
Figure 12:
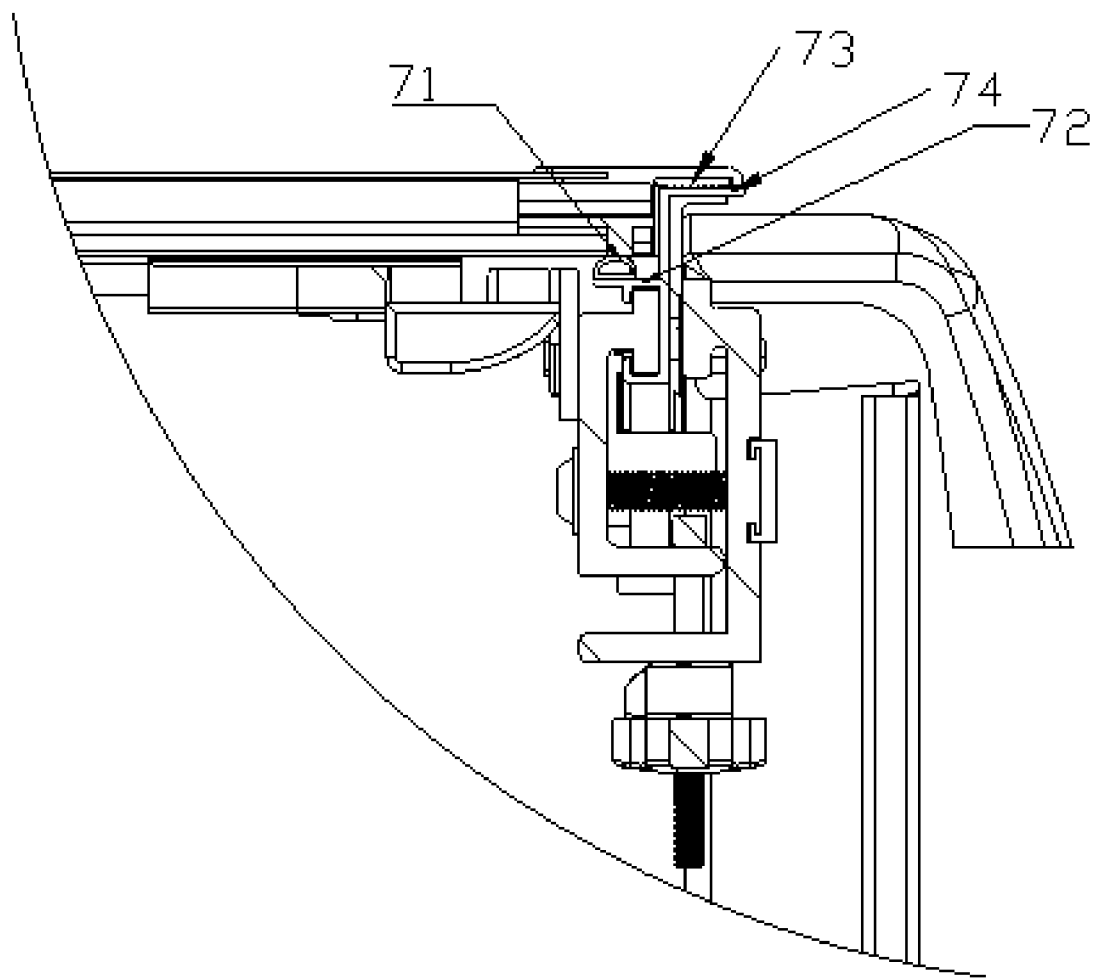
FIG. 12 is the connection schematic diagram of the first waterproof rubber strip.

On the basis of embodiment 2, as shown in FIGS. 10 and 11, the rotating shaft system includes a first rotating shaft system 2 and a second rotating shaft system 3, the intermediate rotating bar 22 of the first rotating shaft system 2 is of the same or a different size to the intermediate rotating bar 22 of the second rotating shaft system 3.

Both the first rotating shaft system 2 and the second rotating shaft system 3 are used for flipping the cover plate, therefore the first rotating shaft system 2 and the second rotating shaft system 3 can be of the same structure or different rotating structure and can also be the same or different in size.

The first rotating shaft system 2 includes a left intermediate bar 21, an intermediate rotating bar 22 and a right intermediate bar 23, the intermediate rotating bar 22 is provided with two rotating grooves 2202 at both ends, the left intermediate bar 21 and the right intermediate bar 23 are each provided with a rotating portion 2302, the rotating portion 2302 is connected to the rotating grooves 2202 by rotation.

The rotating portion 2302 and the rotating groove 2202 forming a second drainage tank.

The mounting groove is provided in the rotating portion 2302, the mounting groove is connected with a second waterproofing strip 27.

Since both ends of the rotating shaft system extend beyond the first waterproof strip 71, all water in the second drainage tank flows into the first drainage tank and is then discharged from the first drainage tank.

The left intermediate bar 21 is able to rotate by about 90° relative to the intermediate rotating bar 22, and the right intermediate bar 23 is able to rotate by about 90° relative to the intermediate bar.

By the rotation of the left intermediate bar 21 and the right intermediate bar 23 with respect to the intermediate rotating bar 22, the cover plate is driven to turn over.

Embodiment 4

Figure 4:
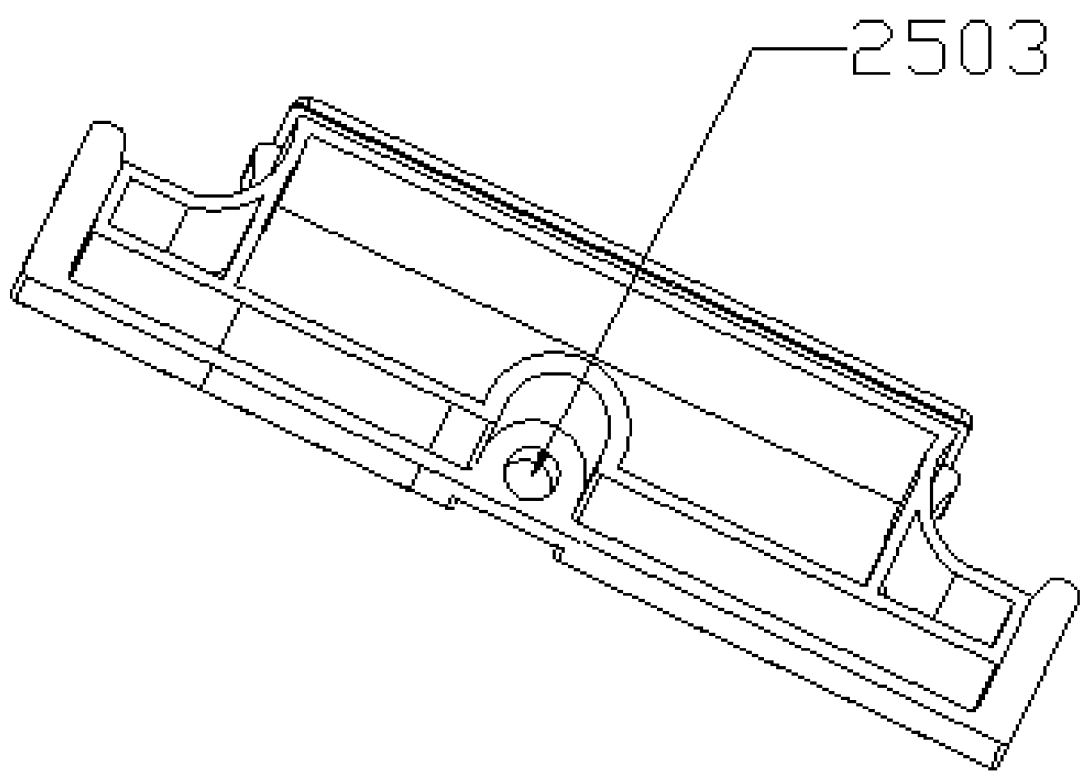
FIG. 4 is the schematic diagram of the intermediate joint.
Figure 5:
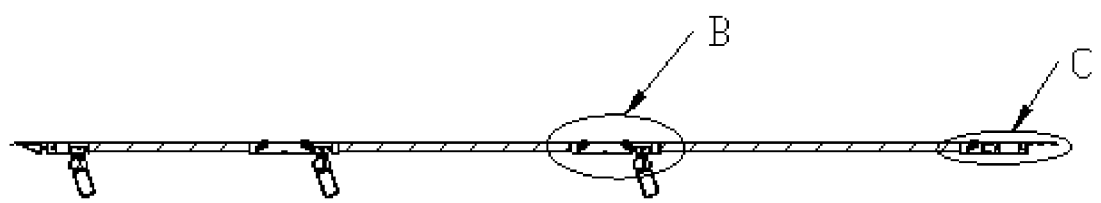
FIG. 5 is the sectional drawing of the cover plate.
Figure 6:
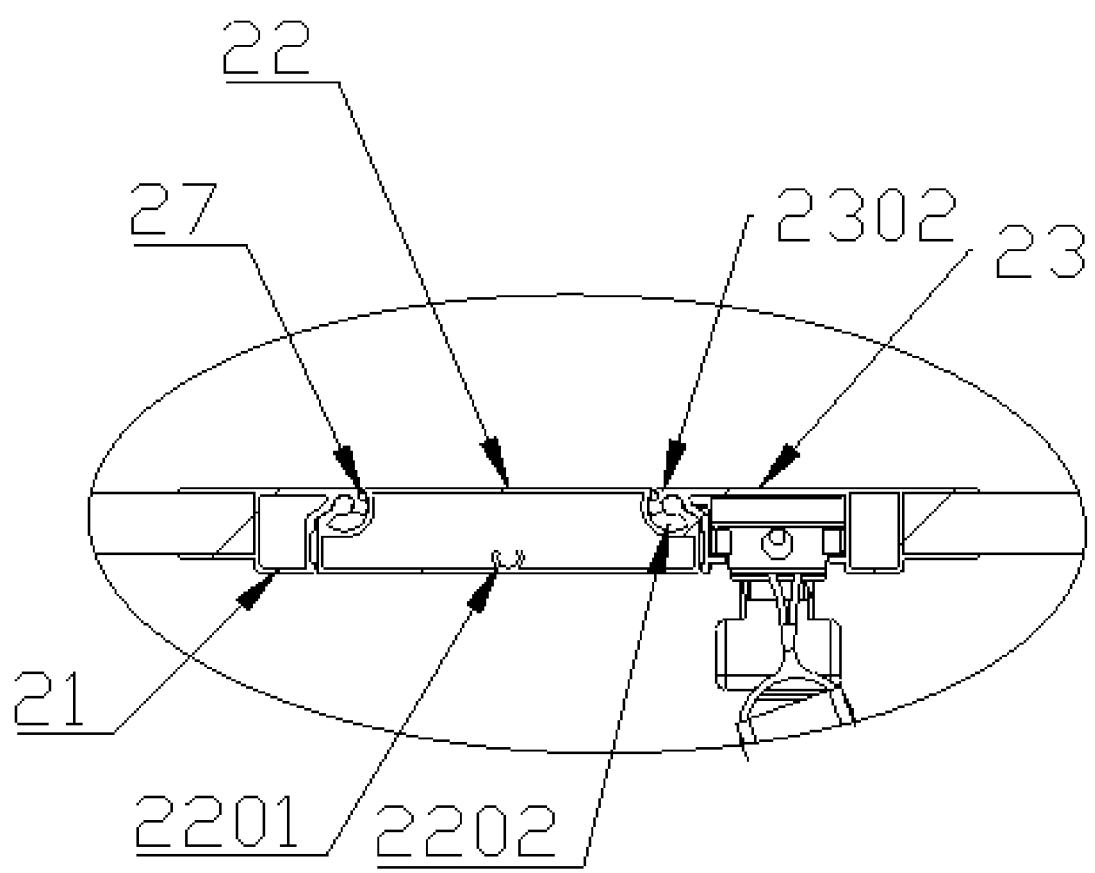
FIG. 6 is the partial enlarged view of part B in FIG. 5.
Figure 7:
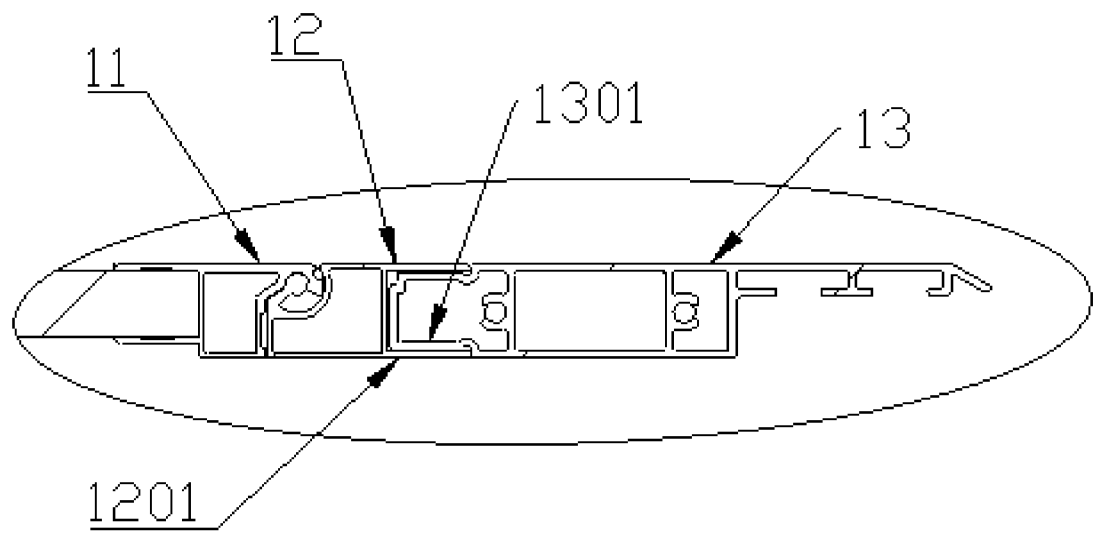
FIG. 7 is the partial enlarged view of part C in FIG. 5.
Figure 13:
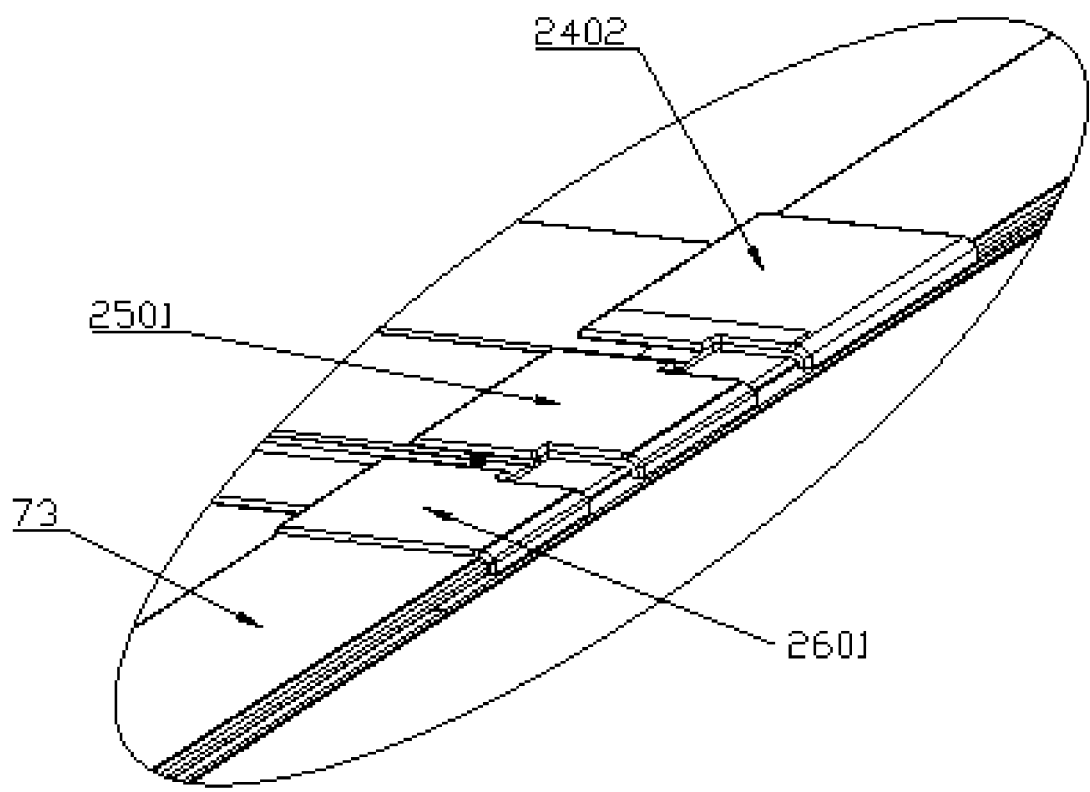
FIG. 13 is the partial enlarged view of part E in FIG. 1.

On the basis of embodiment 3, as shown in FIGS. 4 and 13, the left intermediate bar 21 is connected with a left joint 26, the right intermediate bar 23 is connected with a right joint 24, and the intermediate rotating bar 22 is connected with an intermediate joint 25.

The intermediate joint 25 is provided with an intermediate joint mounting hole 2503 and an intermediate joint drainage section 2502, the intermediate joint mounting hole 2503 is provided in correspondence with intermediate rotating bar screw fixing groove 2201, the intermediate joint drainage section 2502 is provided in correspondence with rotation groove 2202.

The right joint 24 is provided with a right joint sealing section, the right joint sealing section is connected to the right intermediate bar 23 by the same second waterproof rubber strip 27, the right joint sealing section is located on the upper side of the intermediate joint drainage section 2502, the right joint sealing section and intermediate joint drainage section 2502 forming a drainage outlet corresponding to the drainage tank formed by the rotation groove 2202 and rotation section 2302.

The joint is used to connect with the rotating bar, while the joint is provided with a drainage outlet, the joint will pressed against the first waterproof rubber strip 71 when installed, water in the second drainage tank will drain into the first drainage tank through the drainage outlet.

The right intermediate bar 23 is provided with a right intermediate bar locking system groove 2301, the right intermediate bar locking system groove 2301 is used to connect the locking system.

By connecting the lock system to the rotating shaft system, the rotating shaft system can be locked to prevent the car cover from opening while the vehicle is running.

Embodiment 5

Figure 2:
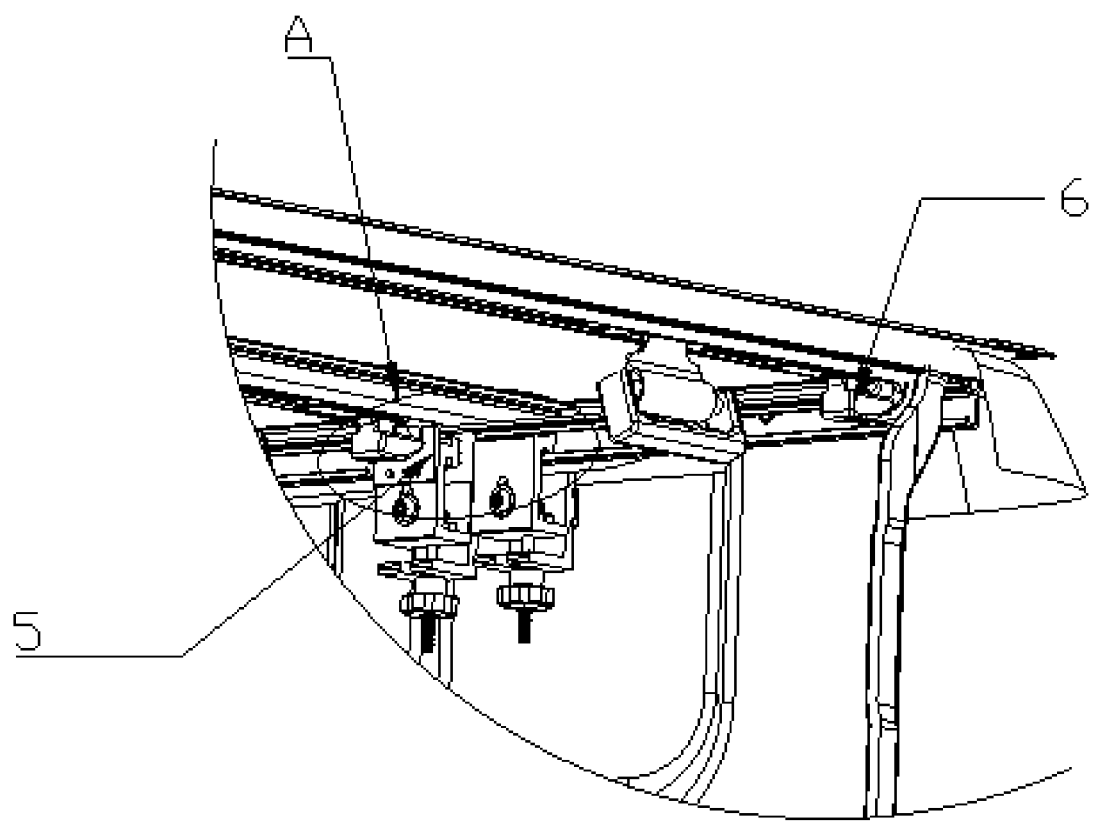
FIG. 2 is the structure schematic diagram of the lock bolt of the invention.
Figure 3:
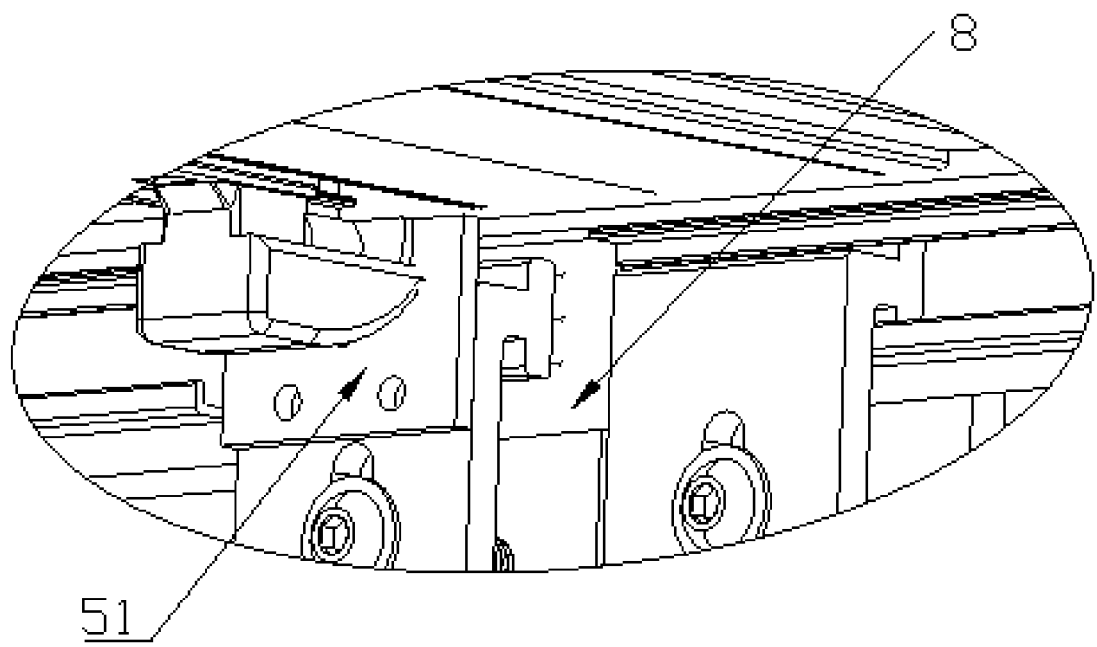
FIG. 3 is the partial enlarged view of part A in FIG. 2.

On the basis of embodiment 4, as shown in FIGS. 2 and 3, the lock system includes a first lock bolt fixing structure 5 and a second lock bolt fixing structure 6.

The first lock bolt fixing structure 5 includes a fixing section and a sliding section, the fixing section includes a clamp and a lock bolt fixing block 51, the clamp is connected to the cargo hopper 8, the cylindrical lock bolt fixing block is connected to the clamp, the sliding section is connected to the rotating shaft system, the sliding section includes a lock bolt, a wire rope and a handle, each end of the wire rope is connected to a lock, the wire rope is sleeved to the handle.

When using, by pulling the handle, the first lock bolt fixing structure 5 can be opened and thus open the car cover, when closing the car cover, it is only necessary to press the cover plate or the rotating shaft system, the lock bolt will pass through the lock bolt fixing block 51 and then snaps into place with the lock bolt fixing block 51.

The second lock bolt fixing structure 6 includes a fixed section and a sliding section, the fixed section includes a lock bolt fixing block 51 connected to the guide rail, the sliding section is connected to a rotating shaft system, the sliding section includes a lock bolt, a wire rope and a handle, each end of the wire rope is connected to a lock bolt, the wire rope is sleeved to the handle.

The first lock bolt fixing structure 5 is directly connected to the cargo hopper 8, so that the guide rails need to be segmented during installation and the guide rails need to be disconnected at the first lock bolt fixing structure 5.

The second lock bolt fixing structure 6 is connected to the guide rail, which can be made integral, so that the lock bolt is directly connected to the guide rail.

The first lock bolt fixing structure 5 and the second lock bolt fixing structure 6 can be of the same or different structure and the dimensions of both can be the same or different.

The left joint 26 and the right joint 24 extend to the cover plate on both sides, extending the length of the left joint 26 and the right joint 24 so that they are in contact with the plate, thus improving the waterproof effect.

Embodiment 6

On the basis of embodiment 5, it further includes two long rubber strips 73, the two long rubber strips 73 are connected to each side of the car cover (herein referred to as the car cover), the long rubber strips 73 are connected to the front bar assembly 1, the rotating shaft system and the rear bar assembly 4.

The left joint 26 further includes a left joint water baffle 2601, the left joint water baffle 2601 is connected to the upper side of the long rubber strip 73.

The right joint 24 further includes a right joint water baffle 2402, the right joint water baffle 2402 is connected to the upper side of the long rubber strip 73.

The intermediate joint 25 further includes an intermediate joint baffle 2501, the intermediate joint baffle 2501 is connected to the upper side of the long rubber strip 73.

The guide rail further includes a guide rail mounting plane 74, the long rubber strip 73 is pressed against the guide rail mounting plane 74 when the car cover is closed.

The left joint water baffle 2601, right joint water baffle 2402 and middle joint water baffle 2501 have flush edges, the left joint water baffle 2601 and right joint water baffle 2402 extend to the cover plate on both sides respectively, as the joint water baffle is connected to long rubber strip 73, setting a plurality of joint water baffles flush can not only improve the stability of the connection with long rubber strip 73, but also provide a good waterproof effect.

The long rubber strip 73 is better waterproof because it comes in one piece and covers both sides of the car cover completely, with no breaks in the middle of the long rubber strip 73. However, the existing rubber strips are often broken at the joint of the rotating shaft system in order to adapt to the rotation of the rotating shaft system, so that the waterproofing effect is greatly reduced by breaking the long rubber strip 73 into multiple segments. Furthermore, although the joint baffle in this invention is located on the upper side of the long rubber strip 73, as it is an embedded car cover and the whole of the cover is located inside the cargo hopper, the centre of the rotating shaft (rotating groove 2202 and rotating section 2302 is located on the lower side of the long rubber strip, so that the long rubber strip 73 is not stretched but compressed while the rotating shaft system is turned upwards, so that a whole long rubber strip 73 does not affect the rotation of the rotating shaft system.

The invention is not limited to the above-mentioned optional embodiments, anyone can come up with various other forms of products under the inspiration of the invention, however, regardless of any changes in its shape or structure, all technical solutions that fall within the scope defined by the claims of the present invention shall fall within the scope of protection of the invention.

What is claimed is:

1. An embedded car cover comprising:
a front bar assembly (1), a cover plate, a rotating shaft system, a rear bar assembly (4), a lock system and two guide rails;
wherein:
the front bar assembly (1), guide rails, and rear bar assembly (4) form a rectangular car cover frame;
each guide rail is connected to a side of a cargo hopper (8) and includes a first waterproof rubber strip (71) on its guide rail plane (72), the first waterproof rubber strip (71) and guide rail together forming a first drainage channel;
the front bar assembly (1) includes a front bar intermediate bar (11) and at least two front bar units, the front bar intermediate bar (11) being rotatably connected to one front bar unit, and the front bar units being interconnected;
the cover plate is connected via the rotating shaft system;
the rotating shaft system is lockable to the guide rails by the lock system and includes a left intermediate bar (21), an intermediate rotating bar (22) and a right intermediate bar (23), the left and right intermediate bars (21, 23) being rotatably connected to the intermediate rotating bar (22).

2. The embedded car cover according to claim 1, wherein: the rotating shaft system includes a first rotating shaft system (2) and a second rotating shaft system (3), the first rotating shaft system (2) having the same structure as the second rotating shaft system (3);
wherein:
the first rotating shaft system (2) includes the left intermediate bar (21), intermediate rotating bar (22), and right intermediate bar (23);
the intermediate rotating bar (22) has two rotating grooves (2202) at both ends and an the intermediate rotating bar screw fixing groove (2201);
the left and right intermediate bars (21, 23) each include a rotating portion (2302) rotatably engaged with the rotating grooves (2202), the rotating portion (2302) and rotating groove (2202) forming a second drainage channel;
the rotating portion (2302) includes a mounting groove;
the intermediate rotating bar (22) of the first rotating shaft system (2) has the same or different dimensions as that of the second rotating shaft system (3);
the left intermediate bar (21) is connected to left joints (26), the right intermediate bar (23) to right joints (24), and the intermediate rotating bar (22) to intermediate joints (25);
the intermediate joint (25) includes an intermediate joint mounting hole (2503) aligned with the screw fixing groove (2201) and an intermediate joint drainage section (2502) aligned with the rotating groove;
the right joint (24) includes a right joint sealing section, connected to the right intermediate bar (23) via a second waterproof rubber strip (27), the sealing section being positioned above the drainage section (2502) to form a drainage outlet aligned with the second drainage channel.

3. The embedded car cover according to claim 1, further comprising:
two elongated rubber strips (73) mounted on both sides of the car cover and connected to the front bar assembly (1), rotating shaft system, and rear bar assembly (4);
wherein:
the left joint (26) includes a left joint baffle (2601) positioned above the elongated rubber strip (73);
the right joint (24) includes a right joint water baffle (2402) positioned above the elongated rubber strip (73);
the intermediate joint (25) includes an intermediate joint water baffle (2501) positioned above the elongated rubber strip (73);
the elongated rubber strip (73) is pressed against the guide rail when the car cover is closed.

4. The embedded car cover according to claim 3, wherein: edges of the left joint baffle (2601), right joint baffle (2402), and intermediate joint baffle (2501) are flush, and the left and right joint baffles (2601, 2402) extend to respective sides of the cover plate.

5. The embedded car cover according to claim 1, wherein; the left and right intermediate bars (21, 23) include mounting grooves connected the cover plate via the second waterproof rubber strip (27).

6. The embedded car cover according to claim 1, wherein; the right intermediate bar (23) includes a right intermediate bar locking system groove (2301) for connecting the lock system;
the lock system includes:
a first lock bolt fixing structure (5) having:
a fixing section with a clamp connected to the cargo hopper (8) and a lock bolt fixing block (51);

a sliding section with lock bolts, a wire rope, and a handle, the wire rope connecting the lock bolts and being sleeved on the handle;

a second lock bolt fixing structure (6) having:

a fixing section with a lock bolt fixing block (51) connected to the guide rail;

a sliding section with lock bolts, a wire rope, and a handle, the wire rope connecting the lock bolts and being sleeved on the handle.

7. The embedded car cover according to claim 1, wherein;

the front bar unit includes a first front bar unit (12) and a second front bar unit (13);

the front bar intermediate bar (11) is connected to the cover plate and rotatably connected to the first front bar unit (12);

the second front bar unit (13) is detachably connected to the first front bar unit (12).

8. The embedded car cover according to claim 7, wherein:

the first front bar unit (12) includes a first front bar concave section (1201);

the second front bar unit (13) includes a second front bar convex section;

the concave section (1201) and convex section form a snap-fit connection.

9. The embedded car cover according to claim 1, wherein;

the second front bar unit (13) includes a front bar mounting port (1302) for connecting to the cargo hopper (8) or guide rails via a fixing member.

\* \* \* \* \*